Patented Feb. 24, 1948

2,436,685

UNITED STATES PATENT OFFICE 2,436,685

SUBSTITUTED PIPERAZINES

Richard Baltzly, New York, and Emil Lorz, Yonkers, N. Y., assignors to Burroughs Wellcome & Co. (U. S. A.) Inc., New York, N. Y., a corporation of New York No Drawing. Application January 6, 1944, Serial No. 517,226

7 Claims. (Cl. 260—268)

This invention relates to N-monosubstituted and N-N'-unsymmetrically disubstituted piperazines and has for an object to provide new compositions of the above type and a novel and improved method of making the same.

Another object is to provide a method of making and isolating the above substances which is suitable for commercial operation.

The main difficulty involved in preparing monosubstituted piperazines, from which unsymmetrically disubstituted derivatives can also be obtained, resides in the production of a reaction mixture containing, in addition to substituted piperazine and symmetrically disubstituted piperazine, a considerable amount of monosubstituted compound which can be readily isolated from the other mixture components. On theoretical grounds it would be predicted that if 1 mol of piperazine were reacted with 1 mol of an acyl or alkyl halide there should result ½ mol of monosubstituted piperazine and ¼ mol each of disubstituted and of unsubstituted piperazine.

The copending applications, Serial No. 476,914 of J. S. Buck and Richard Baltzly, filed February 24, 1943, now Patent No. 2,415,785, issued February 11, 1947, and Serial No. 517,225, of J. S. Buck and Richard Baltzly, filed January 6, 1944, now Patent No. 2,415,787, issued February 11, 1947, described methods for preparing mono-aralkyl substituted piperazines and piperazines monosubstituted with higher alkyls in which reaction mixtures of approximately this predictable composition are obtained. It was found, however, that similar treatments of piperazine with agents containing acid radicals for the introduction of an acyl or of a sulfonyl group frequently yielded mixtures containing much smaller proportions of mono-acyl-substituted or mono-sulfonyl-substituted piperazines and, consequently, mono-acyl or mono-sulfonyl-substituted piperazines and their unsymmetrically disubstituted derivatives could heretofore be prepared only by complicated methods requiring extraordinary precautions.

We have found that this difficulty is readily overcome if the reaction is carried out in the presence of such a solvent and under such conditions that the reactants remain in substantially homogeneous solution throughout the course of the reaction.

It was found that the above mentioned theoretical prediction as to the proportion of monosubstituted compounds formed applies only if the reaction is carried out in a homogeneous system. If two or more phases are present, major deviations from the theoretical proportions occur due to the different solubilities of the individual reaction products in the several phases.

Thus, if piperazine is dissolved in water and benzoyl chloride added, the latter forms a separate layer. When some mono benzoyl piperazine has been formed, it is more soluble in the benzoyl chloride layer than the unsubstituted piperazine. Monobenzoyl piperazine therefore passes into the non-aqueous layer, there to be benzoylated preferentially. As a consequence, the dibenzoyl product predominates.

Similarly unsatisfactory results are obtained if piperazine is reacted with an acyl halide or sulfonyl halide in absolute alcohol. The dihydro-halides of piperazine are very slightly soluble in absolute alcohol. When the reaction has proceeded so far that considerable amounts of acid have been produced, piperazine hydrohalide precipitates, leaving in solution mono-substituted piperazine to be substituted a second time without competition.

According to the present invention piperazine is reacted in a solution which is kept homogeneous throughout the reaction with a reagent selected from the group consisting of the acyl anhydrides, such as acetic anhydride, phthalic anhydride and succinic anhydride, the acyl halides, such as benzoyl bromide, butyryl chloride and ethylchlorocarbonate, the aryl sulfonyl halides, such as toluene sulfonyl chloride and the substituted aryl sulfonyl halides, such as p-acetamidobenzene sulfonyl chloride.

In this manner mixtures are formed which contain, in addition to unsubstituted piperazine, and symmetrical disubstituted piperazine, considerable quantities of monosubstituted piperazine. The mixture components may be separated by utilizing the inability of the diacyl and disulfonyl piperazines to form salts and the different solubilities of the salts of monoacyl and monosulfonyl piperazine and of unreacted piperazine.

The following solvents have been found useful in our acylating process: the aqueous commercial alcohols, aqueous dioxane, aqueous acetone and, where acetic anhydride is used as reagent, glacial acetic acid.

If the reaction is carried out with an acyl halide, or with a sulfonyl halide, the hydrohalide salts of the unreacted piperazine and of the monosubstituted piperazine are formed automatically during the principal reaction. However, the addition of an excess of a salt forming agent may be desirable in certain cases. If an acylation is effected with an anhydride, it is necessary to add to the reaction mixture a strong acid such as hydrochloric acid, sulphuric acid or oxalic acid, in order to permit the formation of the salts and the successive extraction of the different mixture components.

After separation, if an unsymmetrically disubstituted piperazine is desired, the second substituent is introduced on to the second nitrogen atom by reacting the monosubstituted compound with a reagent such as for instance an alkyl halide, a phenacyl halide, a substituted phenacyl halide, nitro urea, an isocyanate, a salt of thiocyanic acid, an isothiocyanic acid, a salt of S-alkyl iso-thiourea or an agent containing an acyl or a sulfonyl different from that present in the monosubstituted compound.

The following examples may serve to illustrate without limiting the invention.

Example 1

One-half mole (43 g.) of anhydrous piperazine was dissolved in 300 cc. of glacial acetic acid. To this was added with stirring 51 g. (0.5 mol) of acetic anhydride. The addition took 15 minutes during which the temperature rose from 48 to 54° C. Stirring was continued for ½ hour and the solution was allowed to stand over-night. Fifty cc. of concentrated HCl was then added and the solution was evaporated in vacuo. The residue, a thick, red-brown syrup was extracted with 300 cc. of hot benzene to remove the di-acetyl piperazine. The benzene-insoluble material was treated with absolute ethanol and the resulting solution filtered off from piperazine dihydrochloride. On addition of ether and standing in the refrigerator the mono-N-acetylpiperazine hydrochloride crystallized.

Example 2

One half mole of piperazine hexahydrate was dissolved in 300 cc. of dioxane and 0.5 mole of benzoyl chloride was added with stirring, the temperature being held at 40–50° C. The solution was stirred for an hour, made strongly acid with HCl and then evaporated in vacuo. The residue was extracted with hot benzene leaving the hydrochlorides of piperazine and monobenzoyl piperazine. These were extracted with absolute alcohol leaving behind piperazine hydrochloride. Monobenzoyl piperazine hydrochloride was then crystallized by addition of ether.

Example 3

One half mole of piperazine hexahydrate was reacted in aqueous acetone with 0.5 mole of butyryl chloride. After completion of the reaction, excess HCl was added and the solution evaporated in vacuo. The dibutyryl piperazine was removed by solution in hot benzene. Extraction with absolute alcohol then served to dissolve monobutyryl piperazine hydrochloride and this was crystallized by addition of absolute ether.

Example 4

One half mole (43 g.) of anhydrous piperazine was dissolved in 300 cc. of 95% ethanol. To this was added, with mechanical stirring, 54 g. (0.5 mole) of ethylchlorocarbonate. The solution warmed itself fairly rapidly (13 minutes) to 50° C. whereupon water cooling was used to keep the temperature below 50° C. At this point solid began to separate and 50 cc. of water were added to restore it to solution. The addition of the ethyl chlorocarbonate required about 30 minutes. Shortly thereafter solid was again observed and two types of crystal were apparent. The solution was allowed to stand over-night. In the morning the solid was filtered off and washed with 10 cc. of absolute ethanol. The undissolved crystals were piperazine dihydrochloride.

The filtrate, which was acid to Congo red, was evaporated in vacuo. The residue was dissolved in water and extracted twice with ether. The ethereal extract, on evaporation, yielded 24 g. of piperazine N,N' bis-ethyl-carboxylate, a gum that crystallized from hexane and then melted at 49° C. The aqueous layer was again taken down in vacuo and extracted with a minimum of absolute alcohol, a small residue of piperazine dihydrochloride being again separated. The yellow solution, on addition of ethylacetate and ether and cooling deposited flesh-colored crystals of mono-N-ethyl-carboxylate piperazine hydrochloride. Recrystallization from absolute alcohol with charcoaling gave a colorless product.

Example 5

One half mole (97 g.) of piperazine hexahydrate was dissolved in 200 cc. of dioxane, and 76 g. (0.4 mole) of p-toluene sulfonyl chloride dissolved in 100 cc. of dioxane were run in with stirring, the temperature being kept below 60° C. After standing over-night the mixture was made acid to Congo-red paper by addition of hydrochloric acid and the mono-p-toluene sulfonyl piperazine hydrochloride isolated by the method of Example 4.

Example 6

Following the method of Example 5, equimolecular proportions of p-acetamidobenzene sulfonyl chloride and piperazine were reacted to produce mono-N-p-acetamidobenzene sulfonyl piperazine hydrochloride which was hydrolyzed with boiling dilute hydrochloric acid to yield mono-N-p-aminobenzene sulfonyl piperazine dihydrochloride.

We claim:

1. In a method of preparing N-substituted piperazines, the steps of reacting piperazine with a reagent selected from the group consisting of the acyl anhydrides, the acyl halides, the aryl sulfonyl halides and the substituted aryl sulfonyl halides in the presence of a solvent selected from the group consisting of the aqueous commercial alcohols, aqueous dioxane, aqueous acetone and glacial acetic acid and maintaining the reaction mixture in such solvent in a single phase solution until the reaction is completed and the mixture contains, in addition to unreacted piperazine and N,N'-disubstituted piperazine, a substantial amount of mono-N-substituted piperazine, and separating the mono-N-substituted piperazine from the unreacted piperazine and from the disubstituted piperazine.

2. A method as claimed in claim 1, in which the piperazine and the acid radical containing agent are reacted in equimolecular quantities.

3. In a method of preparing N-substituted piperazines, the steps of reacting piperazine with a reagent selected from the group consisting of the acyl anhydrides, the acyl halides, the aryl sulfonyl halides and the substituted aryl sulfonyl halides in the presence of a solvent selected from the group consisting of the aqueous commercial alcohols, aqueous dioxane, aqueous actone and glacial acetic acid and maintaining the reaction mixture in such solvent in a single phase solution until the reaction is completed and the mixture contains, in addition to unreacted piperazine and N,N'-disubstituted piperazine, a substantial amount of mono-N-substituted piperazine and separating the mixtures by utilizing the inability of the disubstituted piperazine to form salts and the different solubilities of the salts of monosubstituted piperazine and of unreacted piperazine.

4. A method as claimed in claim 3 in which after completion of the reaction a strong acid is added to the reaction mixture as a salt forming agent.

5. A method of preparing mono-N-acetyl piperazine comprising the steps of dissolving anhydrous piperazine in glacial acetic acid, adding an equimolecular amount of acetic anhydride, stirring until the reaction has been completed, adding hydrochloric acid, evaporating the solution in vacuo, extracting the di-acetyl piperazine with non-polar solvent, treating the residue with absolute ethanol to dissolve the mono-acetyl piperazine hydrochloride, separating the solution by filtering from the undissolved piperazine dihydrochloride and recrystallizing the mono-acetyl piperazine hydrochloride from the solution by the addition of ether.

6. A method of preparing piperazine mono-N-ethylcarboxylate comprising the steps of dissolving piperazine in 95% ethanol, adding an equimolecular amount of ethylchlorocarbonate, introducing, under constant stirring, sufficient water to keep the solution homogeneous throughout the reaction, permitting after completion of the reaction the precipitation of solid piperazine dihydrochloride, filtering, evaporating the filtrate in vacuo, dissolving the residue in water, extracting the piperazine N,N' bis-ethyl carboxylate with ether, evaporating in vacuo, extracting with absolute alcohol, filtering off a further small quantity of piperazine dihydrochloride, and cooling the solution under addition of ethylacetate and ether to obtain crystalline piperazine mono-N-ethylcarboxylate.

7. A method of preparing mono-N-p-aminobenzene-sulfonyl piperazine dihydrochloride comprising the steps of dissolving equimolecular proportions of piperazine and p-acetamidobenzene-sulfonyl chloride in aqueous dioxane, stirring the solution while the temperature is kept below 60° C., adding hydrochloride acid to precipitate solid piperazine dihydrochloride, filtering, evaporating the filtrate in vacuo, dissolving the residual in water, extracting the N,N'-disubstituted piperazine with ether, evaporating in vacuo, extracting with absolute alcohol, filtering off a further small quantity of piperazine dihydrochloride, cooling the solution under addition of ethylacetate and ether to obtain crystalline mono-N-p-acetamidobenzene sulfonyl piperazine hydrochloride and hydrolyzing this product with boiling dilute hydrochloric acid to yield mono-N-p-aminobenzene sulfonyl piperazine dihydrochloride.

RICHARD BALTZLY.
EMIL LORZ.

REFERENCES CITED

The following references are of record in the file of this patent:

UNITED STATES PATENTS

| Number | Name | Date |
|---|---|---|
| 2,113,357 | Mietzsch | Apr. 5, 1938 |
| 2,362,276 | Joyne | Nov. 19, 1944 |

OTHER REFERENCES

Journal of the Chemical Society (London) 1929, pages 39–49.

Journal of the Chemical Society (London) 1914, vol. 105, pages 221-2.

Berichte, vol. 66, pages 113-115.